United States Patent [19]

Kammler et al.

[11] Patent Number: 4,848,549

[45] Date of Patent: Jul. 18, 1989

[54] COAXIAL ADJUSTABLE HYDRAULIC CLUTCH ACTUATOR

[75] Inventors: Thomas L. Kammler; Charles L. Thomas, both of Belleville, Ill.

[73] Assignee: Chipper Industries, Inc., Belleville, Ill.

[21] Appl. No.: 179,271

[22] Filed: Apr. 8, 1988

[51] Int. Cl.[4] .................... F16D 25/08; F16D 13/75

[52] U.S. Cl. .................... 192/85 CA; 192/91 A; 192/110 R; 192/111 R; 192/111 B

[58] Field of Search .......... 192/85 CA, 91 A, 110 R, 192/111 R, 111 B

[56] References Cited

U.S. PATENT DOCUMENTS

| | | | |
|---|---|---|---|
| 2,422,155 | 6/1947 | Wemp | 192/85 CA |
| 2,757,769 | 8/1956 | Roise | 192/109 R |
| 2,885,049 | 5/1959 | Staadt | 192/91 A |

FOREIGN PATENT DOCUMENTS

| | | | |
|---|---|---|---|
| 904380 | 2/1954 | Fed. Rep. of Germany | 192/91 A |

*Primary Examiner*—Rodney H. Bonck
*Assistant Examiner*—David A. Testardi
*Attorney, Agent, or Firm*—Kalish & Gilster

[57] ABSTRACT

A coaxial adjustable hydraulic clutch actuator of the invention for use with an automotive transmission and clutch, as in a racing vehicle for coupling power from the engine to the transmission. The transmission has a power input shaft and the clutch has actuating elements, the engine and transmission being joined by a bell housing. The actuator includes a base housing configured for retaining a bearing of the input shaft. A sleeve extends forwardly from the base housing coaxial with the input shaft. A piston is fitted coaxially within the sleeve and is received within an annular hydraulic fluid chamber to which hydraulic fluid is supplied under pressure from exteriorly of the bell housing. A clutch throw-out bearing is carried coaxially by the piston for being driven into throw-out engagement with the actuating elements of the clutch by movement of the piston in response to the hydraulic fluid pressure for clutch actuating operation. The piston is resiliently urged toward the base housing by a sleeve and spring assembly for normally maintaining the actuating bearing in a disengaged position. The base housing includes provision for adjusting the axial position of the throw-out bearing in precise disengaged position relative to the clutch actuating elements.

13 Claims, 3 Drawing Sheets

COAXIAL ADJUSTABLE HYDRAULIC CLUTCH ACTUATOR

BACKGROUND AND SUMMARY OF THE INVENTION

The present present invention relates to actuators for clutches which couple an engine to a drive train and, more particularly, to a hydraulic actuator of adjustable character.

Automobile and other vehicular and automotive racing imposes severe demands upon drive train components because of the speed and high dynamic forces to which the components are exposed. For these reasons, automotive racing equipment must be designed for extreme lightness yet with sufficient strength for surviving under the most grueling conditions involving high angular velocities and angular acceleration, high temperatures, and high forces. In coupling engines to transmissions in racing automobiles, it is desirable to be able to actuate the clutch by hydraulic means in order to dispense with the usual actuating linkage, which is both cumbersome and exposed to damage from being hit with flying objects. Also, racing equipment desirably should be easy to install and permit replacement and installation in a minimum of time, such as when a transmission must be replaced within the least possible time. However, the use of hydraulic actuators presents a secondary problem of providing assured means of spacing a clutch-actuating mechanism in precise relationship to the clutch which it is to operate. This is complicated because there are many different kinds of engine and transmission combinations which have different spacings. In order to adapt a racing clutch to various of these combinations, heretofore it has been necessary to add spacers, shims or otherwise to reconfigure an installation on a custom basis. It has been proposed to utilize hydraulic clutch actuators which utilize a piston arrangement for permitting the piston to accommodate various possible spacings for a specific installation but typical of these designs is the requirement that the actuating component bear at all times against a throw-out bearing. This latter configuration has been termed self-adjusting but is, in fact, not truly self-adjusting but instead designed for permitting extraordinary piston travel, which can compromise strength as well as also being undesirable because the bearing is exposed to certain pressure at all times with consequent wear and loading upon the rotating components.

It is much more desirable if a hydraulic clutch actuator can be of a truly adjustable nature, i.e., may be provided with a disengagement position which is in precise proximity to clutch-operating components but will not actually contact or engage same until the driver, by pedal actuation, pauses in hydraulic engagement of the clutch.

In general, prior art hydraulic clutch actuators have been extremely difficult to install and remove, requiring either a complicated procedure and extensive time to change the clutch assembly and its actuator, which time is critical if a failure should occur during a race or in other circumstances where the components must be changed prior to resuming racing.

Accordingly, among the several objects of the present invention may be noted the provision of a coaxial adjustable hydraulic clutch actuator for automotive racing which can be adjusted without resort to spacers or other shimming procedures, to provide for precise placement of the clutch and its associated actuating components; which can be utilized with a wide variety of engine, clutch and transmission combinations; which is extremely easy to install and to adjust; which, when so adjusted, does not load or otherwise apply pressure to a throw-out bearing when the clutch is not being actuated which can be installed without modification of an engine's flywheel bell-housing; which physically retracts a throw-out bearing from contact with clutch actuator fingers when the clutch is not being actuated for disengagement; which is extremely compact and lightweight without compromise of strength or reliability; which is of precision character; yet is extremely economically constructed without compromise of high performance and longevity in use providing assurance against failure during use, as during a race; which can be used with a variety of different hydraulic master cylinder types; which can be transferred from one vehicle or transmission to another without damage or replacement of parts or hydraulic lines; which also provides a function of retaining a transmission input shaft bearing; which can be adjusted after it is already installed; which can be readjusted at any time quickly and easily; which includes means for keeping dirt or other other contaminants out of the operating parts thereof; which provides for extremely quick and easy "bleeding".

Briefly, a coaxial adjustable hydraulic clutch actuator of the invention is used with an automotive transmission and clutch, as in a racing vehicle for coupling power from the engine to the transmission, the transmission having a power input shaft and the transmission having actuating elements, the engine and transmission being joined by a bell housing, the actuator comprising a base housing providing means for retaining a bearing of the input shaft, a sleeve extending forwardly from the base housing with the input shaft extending coaxially through the sleeve, a piston fitted coaxially within the sleeve and providing between the piston and sleeve an annular chamber, both the piston and sleeve being coaxial to the input shaft, means for supplying hydraulic fluid under pressure to the chamber from exteriorly of the bell housing, a clutch actuating bearing carried coaxially by the piston for being driven into throw-out engagement with the clutch actuating elements by movement of the piston in response to said hydraulic fluid pressure for clutch actuating operation, means for resiliently urging the piston toward the base housing for normally maintaining the actuating bearing in a disengaged position, and means carried by the base housing for selectively adjusting the axial position of the actuating bearing in precise disengaged position relative to the clutch actuating elements.

Other objects and features will be in part apparent and in part pointed out below.

BRIEF DESCRIPTION OF THE DRAWINGS

Corresponding reference characters indicate corresponding parts throughout the several views of the drawing.

DESCRIPTION OF THE PREFERRED EMBODIMENTS

Figure 1:
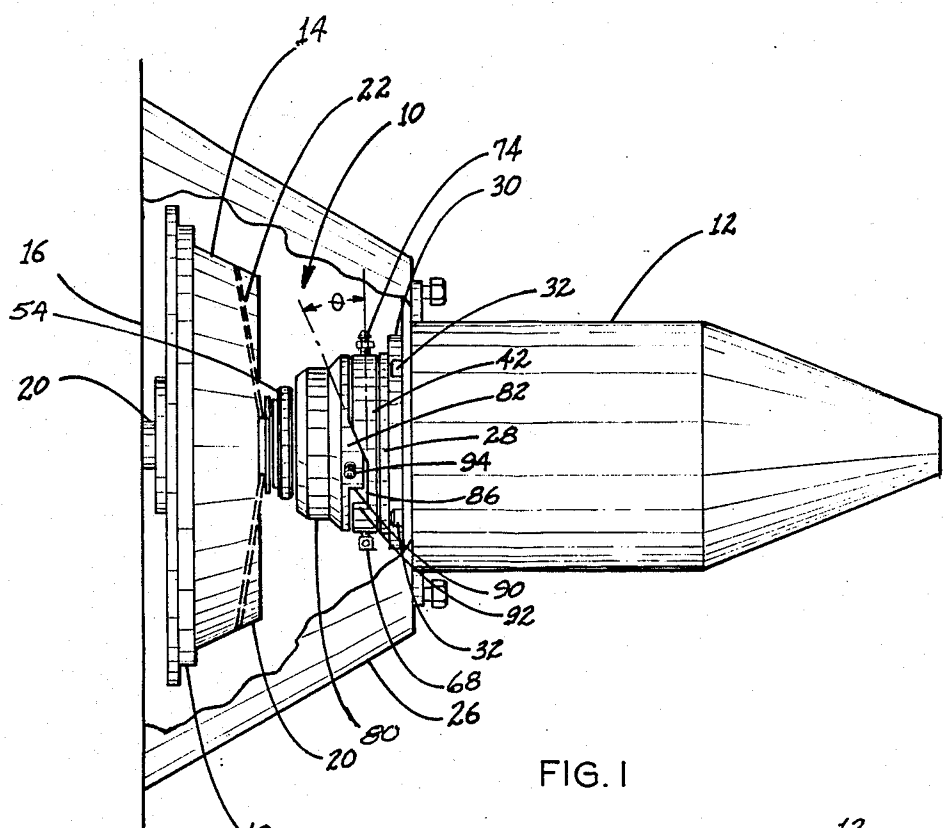
FIG. 1 is an elevation view, partly broken away, providing a simplified illustration of an automotive racing transmission and bell housing for coupling the transmission to an engine, and illustrating a coaxial adjustable hydraulic actuator in accordance with and embodying the present invention.

Referring to FIG. 1, a first version of a coaxial adjustable hydraulic clutch actuator is designated generally 10. Actuator 10 is used with an automotive transmission 12, such as particularly of the type used in a racing vehicle having a clutch 14 for coupling power from an engine 16 to the transmission. Clutch 14 is carried by a flywheel 18 turned by the power output shaft 20, i.e., the crankshaft of the engine, and typically includes a clutch housing 20 and clutch actuating fingers 22 which are to be pressed inwardly toward the engine for disengaging the clutch and to be released for engaging the clutch. Actuator 10, used for actuating the clutch by depressing fingers 22 for this purpose, is located concentrically and coaxially upon a power input shaft 24 (FIG. 2) which extends forwardly of transmission 12. A bell housing 26 conventionally couples transmission 12 to engine 16, enclosing clutch 14 and actuator 10.

Figure 2:
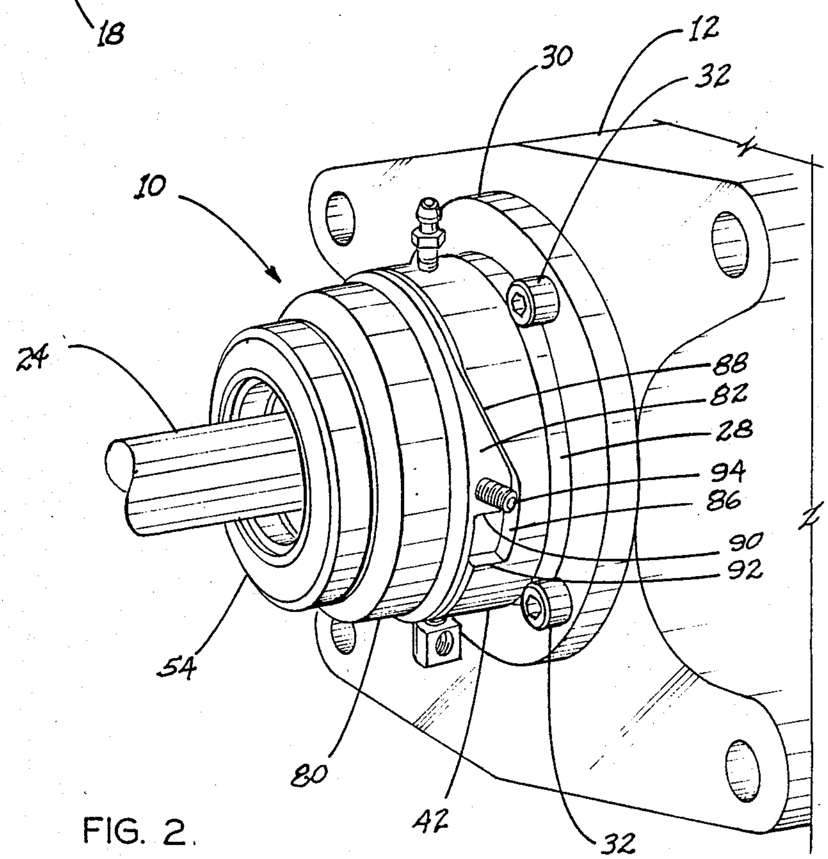
FIG. 2 is a perspective view of a first version of a coaxial adjustable hydraulic clutch actuator of the invention.
Figure 3:
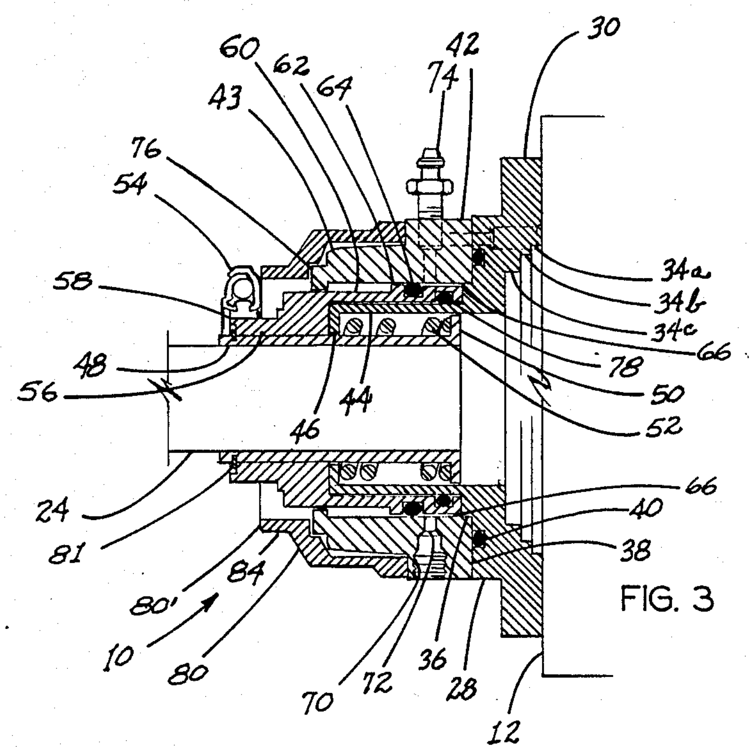
FIG. 3 is a vertical section of the version of FIG. 2.

Referring to FIGS. 2 and 3, the features of the new hydraulic actuator are more apparent. Actuator 12 includes a base 28 including a base flange 30 which extends radially from base 28 and includes a circular outer periphery. Flange 30 is secured to transmission 12 by bolts 32. Flange 30 has machined within it a series of circular, shallow coaxial recesses 34*a*, 34*b*, 34*c* which serve the function of retaining the conventional transmission input shaft bearing (not shown) characteristic of automotive transmissions and for which there normally would be a bearing retainer, which is replaced by the present actuator. The input shaft bearing will be reliably received by the appropriate recesses 34*a*, 34*b*, 34*c* and retained in proper position with the actuator coaxial to the input shaft 24 which, of course, extends through and beyond actuator 10 for having engine power coupled to it by clutch 14.

Base 28 includes a central portion 36 of relatively reduced diameter including a flat shoulder 38, in which is machined an annular groove for receiving an O-ring 40. Seated upon shoulder 38 is a sleeved base housing 42 including a sleeve portion 43 extending outwardly (i.e., forwardly) of the transmission. Extending upwardly into base housing 42 is a central internal sleeve 44 of base 28 which includes at its outer end a radial flange 46, through which extends a sleeve 48 through which input shaft 24 extends coaxially. Sleeve 48 is axially moveable relative to input shaft 24 and is not rotationally engaged to shaft 24, which will rotate within sleeve 48. Sleeve 48 defines at its inner end a radial flange 50 which is outwardly directed toward base sleeve 44. At 52 is indicated a coiled compression spring which reacts at its opposite ends against flanges 46, 50 for biasing sleeve 48 resiliently toward the transmission. As will soon be understood, this has the function of maintaining a throw-out bearing 54 in a disengaged position.

Indicated at 56 is a piston member including an inner sleeve portion 58 closely fitted on sleeve 48 and an outer sleeve portion 60 which includes an enlarged thickness inner end 62 including an annular groove in which is located an O-ring 64 for providing a sealing relationship with the base housing 42 and its sleeve portion 43, and providing between said sleeve 43 and base portion 42 an annular chamber 66 in which hydraulic fluid under pressure may be introduced by a fitting 68 through a pressure inlet 70 which includes an inner passage 72 opening into chamber 66. Diametrically opposed from fluid inlet 70 is a comparable passage in which is received a bleed fitting 74 which can be loosened so that air can be bled from chamber 66. It will be understood that a conventional hydraulic line (not shown) extends outwardly from bell housing 26 for being supplied with such hydraulic fluid by a clutch actuating master cylinder, as will be known to those in the automotive design field.

It may be observed that a radially inwardly directed flange 76 is provided on the outer end of sleeve portion 43 for providing a stop for limiting outer movement of piston 56 by engagement of its inner end 62. It will also be apparent that an O-ring 78 is carried internally of said piston end portion 62 for sealing relationship with sleeve 44. Accordingly, it will be understood that hydraulic pressure will cause movement of piston 56 outwardly from base member 42, i.e., outwardly from transmission 12, for pressing throw-out bearing 54 into engagement with clutch actuating fingers 22 for disengagement of the clutch. It will be observed that throw-out bearing 54 is carried by piston sleeve portion 58 in tightly press-fitted relationship. Thus, it will be apparent that piston 56 is coaxial not only with sleeve 43 of the base member 42 but also with the inner sleeve 44 carried by the base flange 36, as well as sleeve 48, so that these elements maintain their coaxial relationship during all modes of usage of actuator 10.

Extending forwardly of base member 42 around the piston assembly just described is a domed sleeve 80. A snap ring 81 is carried at the outer end of inner sleeve 48 so that, in the absence of hydraulic pressure, sleeve 48, under the force of spring 52, will cause retraction of piston 56 and the throw-out bearing for normally maintaining the position shown in FIG. 3 with the throw-out bearing supported on a shoulder 80′ formed by a necked-down outer end of bell-shaped sleeve 80.

Referring to FIG. 2, base housing 42 includes structure for selectively adjusting the longitudinal position of sleeve 80 and thereby of throw-out bearing 54. It is desired to maintain throw-out bearing 54 out of direct contact with actuating fingers 22 but in close, precise proximity with a spacing of a few thousandths of a inch between the throw-out bearing and fingers 22 when the clutch is in its disengaged position and so that there will be no pressure maintained on the throw-out bearing or consequent mechanical loading or friction when the clutch is engaged for coupling the engine to the transmission. Spring 52, urging sleeve 48 toward the transmission, positions the throw-out bearing to the disengaged position shown in FIG. 3, but by adjustment of the foregoing adjustment means carried by the base housing, the spacing between the throw-out bearing and clutch actuating fingers 22 can be precisely adjusted. This adjustment feature includes a ramp-forming inner end extension 82 (FIG. 2) of sleeve 80.

The outer reduced diameter portion 84 of sleeve 80 with its shoulder 80′ abuts against throw-out bearing 54 and thereby determines its axial position when disengaged. The relative position of sleeve 80 can be precisely set by rotating it upon its axis for corresponding movement of ramp-forming surface 82 relative to a comparable ramp-forming recess 86 of base member 42. Said recess 86 provides a shoulder 88. This shoulder and corresponding surface of ramp-forming projection 82 are complimentarily shaped, and whereby the ramp surfaces form, in effect, a spiral helix, or planar approximation thereof, forming an acute angle relative to the normal to the longitudinal axis of rotation of the input shaft, with angular orientation $\theta$ which may, for example, be about 15°. Projection 82 and corresponding recess 88 together form opposed flat shoulders 90, 92, each lying in a respective axial plane (i.e., a plane which includes the axis of rotation of shaft 24). Surfaces 90, 92 may abut if sleeve 80 is rotated clockwise with respect to transmission 12 about the axis of shaft 24 but, upon selective opposite rotation, as aided by forcing a tool between said surfaces 90, 92, ramp forming projection 82 will climb upon the corresponding ramp surface of recess 86 to shift sleeve 80 axially outwardly from transmission 12 for moving throw-out bearing 54 into position closely adjacent the actuating fingers but, as noted, out of actual contact with them. A lock screw 94 threaded into projection 82 may be tightened upon such adjustment, to lock the relative angular position of sleeve 80 relative to base member 42.

Although actuator 10 is shown to be provided with only one such projection 82 and corresponding recess 86 for adjustment of axial position, a pair or more of such combinations of ramp-forming projections and recesses may be provided with respect to sleeve 80 and base member 42.

It will, of course, be understood that bell housing 26 typically is provided with an opening (not shown) for extension of a clutch-operating fork or arm for disengaging the clutch by conventional means. Since the present actuator does not require such an arm or fork, the opening through the bell housing 26 is used for gaining access the actuator for forcing a thin tool between said surfaces 90, 92 for setting the axial position of throw-out bearing 54 by rotation of sleeve 80, following which set screw 94 is tightened to maintain such precise relationship, also by access through the bell housing opening conventionally provided.

Figure 4:
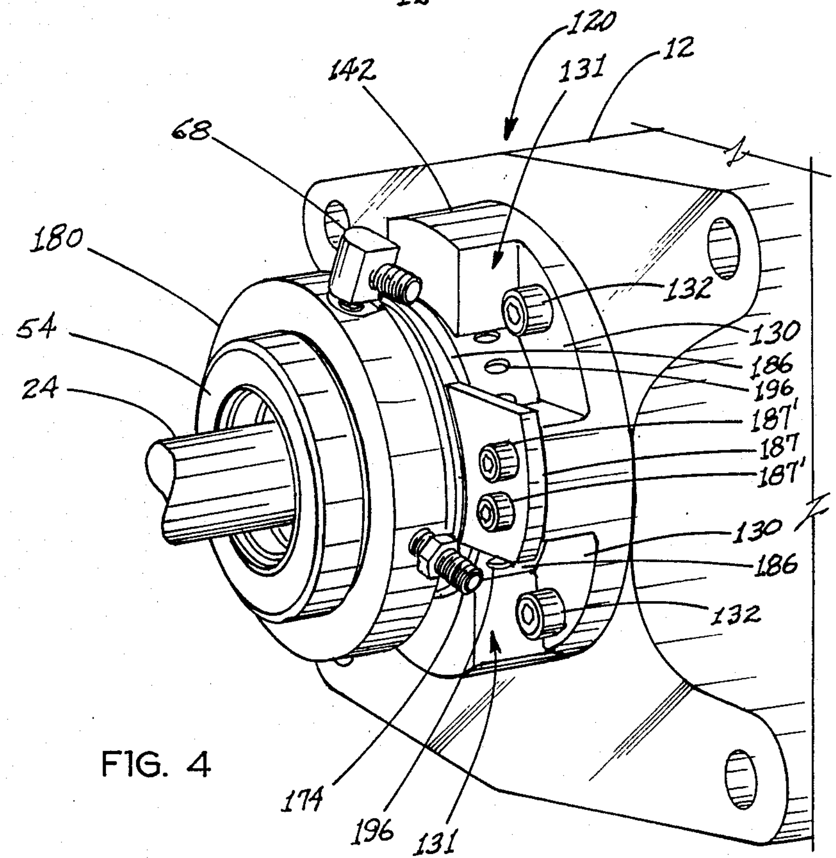
FIG. 4 is a perspective view of a second version of a coaxial adjustable hydraulic clutch actuator of the invention.
Figure 5:
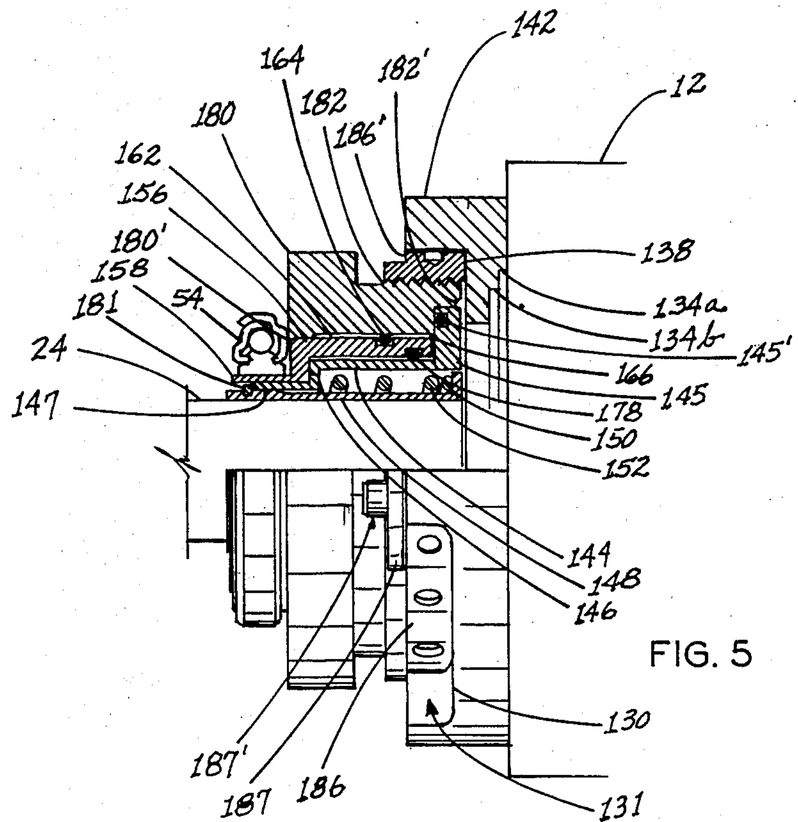
FIG. 5 is a vertical section of the version of FIG. 4.
Figure 6:
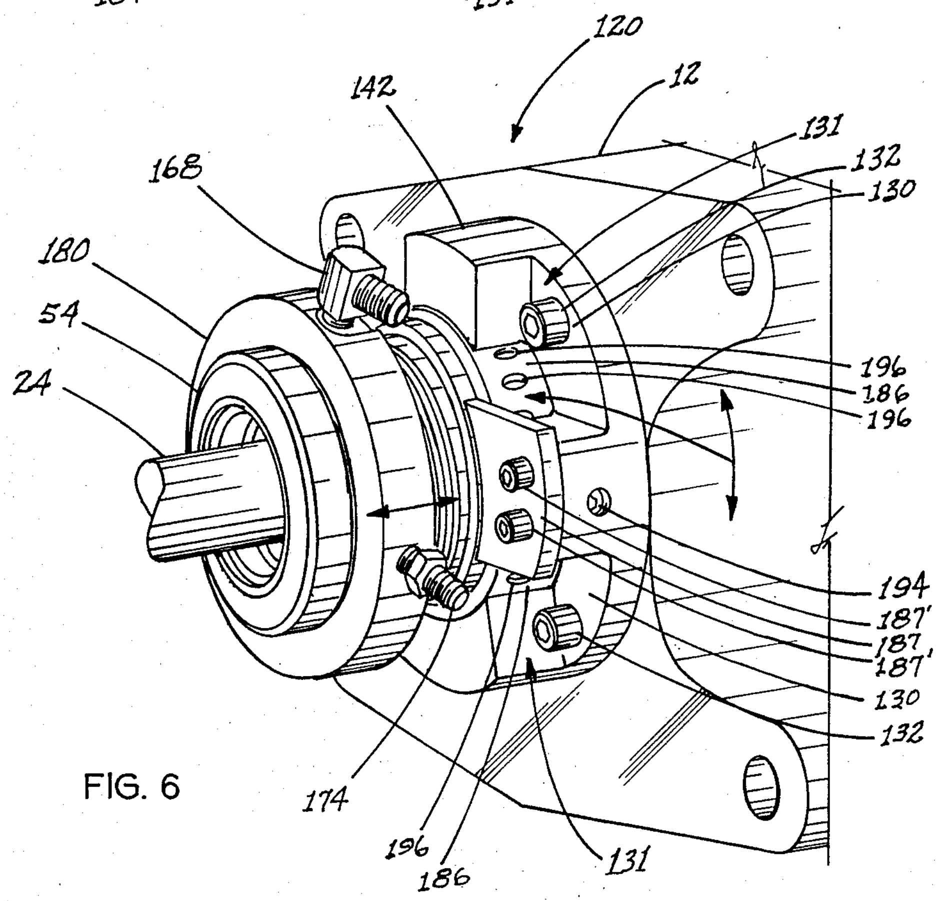
FIG. 6 is a perspective view of the version of FIG. 4 with an adjusted relative position of parts.

Referring now to FIGS. 4–6, an alternate version of an actuator of the invention is designated generally 120 and simiarly is carried by transmission 12 in coaxial relationship with the transmission input shaft 24.

A base housing member 142 is provided with integrally formed base flanges 130 secured by bolts 132 to transmission 12, by providing periodic recesses 131 around the inner periphery of base member 142. These recesses will serve also another purpose to be explained. Circular recesses 134*a*, 134*b* are machined or otherwise formed in the rear face thereof for serving as bearing retainers for shaft 24. This arrangement provides a series of columns between recesses 131, a pair of which columns 142' will serve for securement of a threaded sleeve 180 which includes an outer shoulder 180' for seating of throw-out bearing 56.

Sleeve 180 includes for this purpose a threaded inner portion 182 upon which is threaded a retainer ring 186 seated within an outwardly directed recess 138 of member 142. Ring 186 includes a shoulder 186' upon which are seated arcuately-formed tabs or flanges 187 secured by machine screws 187', so that ring 186 is rotatably captive but selective rotation of ring 186 will cause shifting of sleeve member 180 axially in or out for adjusting the position of throw-out bearing 56.

As in the previous embodiment, throw-out bearing 56 is tightly press-fitted on a sleeve extension 158 of a piston 156 which includes an inner end 162 including O-rings 164, 178 which respectively seal piston 156 relative to an inner surface of member 180 and an internal sleeve 144. The latter includes a base flange 145 having formed in its outer surface near the periphery a groove carrying an O-ring 145' for providing a seal against a corresponding inwardly-directed shoulder of threaded sleeve portion 182 which for this purpose is formed with a recess 182' which defines such shoulder.

A further sleeve 148 immediately surrounds shaft 24 within sleeve 144 and has at its base a radial flange 150 against which bears one end of a coiled compression spring 152. The other end of the spring bears against a radial flange 146 of sleeve 144. The outer end of sleeve 148 carries a snap ring 181 which bears against a ring 147 upon which piston sleeve 158 is seated. Consequently, spring 152 forces throw-out bearing 54 to be seated against an outer shoulder 180' of sleeve 180.

Members 131, 142, 144, 148, 152, 156, 158 and 180 as well as throw-out bearing 54 are all concentric with shaft 24.

Like version 10, version 120 is provided with a hydraulic pressure fitting 168 which communicates with a chamber 166 defined between piston position 162 and sleeve 182. A bleed fitting 174 also communicates with chamber 168. Accordingly, when hydraulic fluid enters chamber 166, piston 156 is displaced outwardly from the transmission for pressing against clutch activating elements 22 for clutch disengagement.

Version 120 is also adjustable to permit the throw-out bearing to be located in precise proximity to the clutch activating fingers, being capable like version 10 for accommodating many possible spacings which would be possible with various engine, transmission and clutch combinations.

Referring especially to FIG. 6, adjustment ring 186 is provided with shallow drilled holes 196 spaced evenly fully around its periphery. These openings are accessible through recesses 131, permitting an adjustment tool such as a narrow screwdriver with elongated shank to be inserted within the typical bell housing opening and into one of apertures 196 with leverage applied to cause selective rotation of ring 186, as shown by rotational directives in FIG. 6, in a direction for shifting the throw-out bearing either toward or away from the clutch, as needed to establish a desired gap between the clutch and throw-out bearing. Directionals indicate resultant axial shifting.

A lock screw 194 is threaded into one of the columns of member 142, as shown in FIG. 6. The lock screw can be tightened upon the periphery of ring 186, reliably maintaining its relative angular position. The lock screw is similarly accessible through the typical bel housing opening.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A coaxial adjustable hydraulic clutch actuator for use with an automotive transmission and clutch, for coupling power from an engine to the transmission, the transmission having a power input shaft and the clutch having actuating elements, the engine and transmission being joined by a bell housing, the actuator comprising a base including a housing, a sleeve extending forwardly from the base housing, a piston fitted coaxially with respect to the sleeve and providing between the piston and the base an annular hydraulic fluid chamber, both the piston and the sleeve being coaxial to the input shaft, the piston being of sleeved character and extending internally of said sleeve, means for supplying hydraulic fluid under pressure to the chamber from exteriorly of the bell housing, a clutch actuating bearing carried coaxially for being driven by the piston into clutch-activating engagement with the actuating elements of the clutch by movement of the piston in response to said hydraulic fluid pressure for clutch actuating operation, and means carried by the base housing for selectively adjusting the axial position of the actuating bearing in precise disengaged position relative to the actuating elements of said clutch, the adjusting means comprising cooperative ramp-forming structure carried by the sleeve and base housing for shifting the sleeve axially along the input shaft relative to the base in response to selective rotation of the sleeve relative to the base housing, and locking means for locking the sleeve in a selected angular orientation relative to the base, the sleeve including a projection defining a ramp-forming surface, and the base housing including a recess for receiving the projection, the recess defining a further ramp-forming surface, said ramp-forming surfaces forming an acute angle relative to the longitudinal axis of rotation of the input shaft.

2. The apparatus of claim 1 wherein said base housing includes means for retaining a bearing of the input shaft.

3. The apparatus of claim 2 wherein the bearing retaining means is defined by at least one coaxial recess formed within the base.

4. The apparatus of claim 1 and further comprising means for resiliently urging the piston toward the base housing for normally maintaining the actuating bearing in the precise disengaged position.

5. The apparatus of claim 4 wherein said resilient means is a compression spring and further comprising a further sleeve extending coaxially internally of said piston including a flange against which one end of the spring bears, and a still further sleeve extending coaxially internally of the further sleeve, one end of the still further sleeve including a flange against which the other end of the spring bears, said still further sleeve including provision for engaging the piston, whereby the piston is urged by the spring in a direction for normally maintaining the actuating bearing in the precise disengaged position.

6. The apparatus of claim 1 wherein the angle is about 15°.

7. The apparatus of claim 1 wherein the actuating bearing is a clutch throw-out bearing.

8. The apparatus of claim 7 wherein the piston includes a sleeved forward extension remote from the base, the throw-out bearing being carried by said extension.

9. A coaxial adjustable hydraulic clutch actuator for use with an automotive transmission and clutch, for coupling power from an engine to the transmission, the transmission having a power input shaft and the clutch having actuating elements, the engine and transmission being joined by a bell housing, the actuator comprising a base including a housing, a sleeve extending forwardly from the base housing, a piston fitted coaxially with respect to the sleeve and forming therewith an annular hydraulic fluid chamber, both the piston and the sleeve being coaxial to the input shaft, the piston being of sleeved character and extending internally of said sleeve, means for supplying hydraulic fluid under pressure to the chamber from exteriorly of the bell housing, a clutch actuating bearing carried coaxially for being driven by the piston into clutch-activating engagement with the actuating elements of the clutch by movement of the piston in response to said hydraulic fluid pressure for clutch actuating operation, and means carried by the base housing for selectively adjusting the axial position of the actuating bearing in precise disengaged position relative to the actuating elements of said clutch, the adjusting means comprising first screw thread-forming means carried by the base housing and second screw thread-forming means, threadably engaged with the first screw thread-forming means and carried by the sleeve, for shifting the sleeve axially along the input shaft in response to selective relative rotation of the first and second screw-thread forming means, and locking means for locking the first and second screw thread-forming means in a selected relative angular orientaton, the second screw thread-forming means comprising a threaded base-proximate inner end of the sleeve, and the first screw thread-forming means comprising an internally threaded ring threaded upon the threaded inner sleeve end, and means for maintaining the ring in rotatably captive relation to the base.

10. The apparatus of claim 9 wherein the actuating bearing is a clutch throw-out bearing.

11. The apparatus of claim 10 wherein the piston includes a sleeved forward extension remote from the base, the throw-out bearing being carried by said extension.

12. The apparatus of claim 9 wherein the ring includes a periphery having apertures spaced therearound for receiving an adjustment tool to effect selective rotation of the ring.

13. The apparatus of claim 12 wherein the locking means comprises a set screw for engaging the periphery of the ring.

* * * * *